(No Model.)
G. J. RECORD.
JACKETED SHIPPING CAN.
No. 291,937. Patented Jan. 15, 1884.
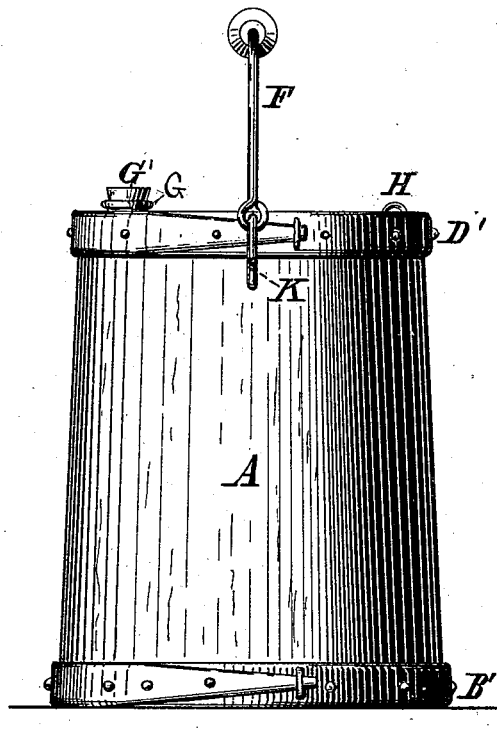
FIG. 1.
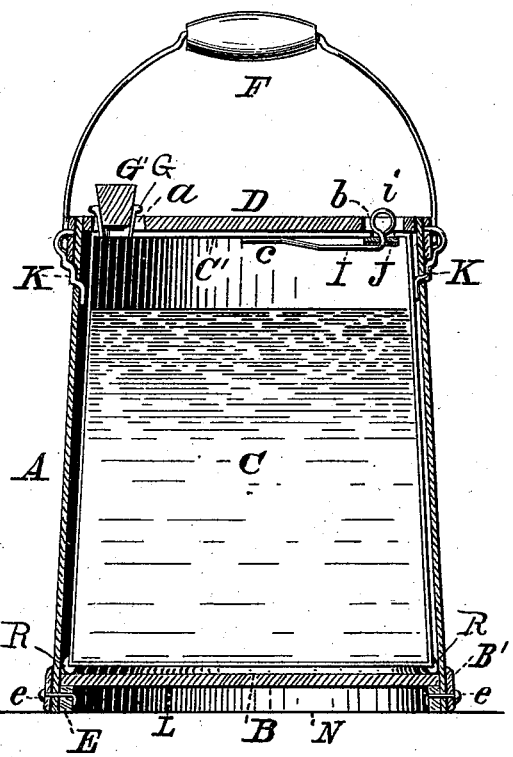
FIG. 2.
FIG. 3.
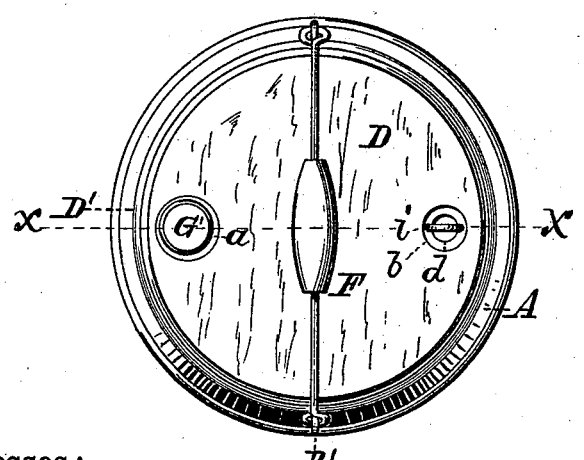
Witnesses:
Al. Stark
Willie O. Stark
Inventor:
Geo. J. Record,
by Michael J. Stark
Attorney.

UNITED STATES PATENT OFFICE.

GEORGE J. RECORD, OF CONNEAUT, OHIO.

JACKETED SHIPPING-CAN.

SPECIFICATION forming part of Letters Patent No. 291,937, dated January 15, 1884.

Application filed August 30, 1883. (No model.)

*To all whom it may concern:*

Be it known that I, GEORGE J. RECORD, of Conneaut, in the county of Ashtabula and State of Ohio, have invented certain new and useful Improvements on a Jacketed Shipping-Can; and I do hereby declare that the following description of my said invention, taken in connection with the accompanying sheet of drawings, forms a full, clear, and exact specification, which will enable others skilled in the art to which it appertains to make and use the same.

My present invention has general reference to jacketed shipping-cans for coal-oil, varnish, drugs, and other liquids; and it consists, essentially, in the novel and peculiar combination of parts and details of construction, as hereinafter first fully set forth and described, and then pointed out in the claims.

In the drawings already referred to, which serve to illustrate my said invention more fully, Figure 1 is a side elevation of my improved jacketed shipping-can. Fig. 2 is a sectional elevation of the same in line $x$ $x$ of Fig. 3. Fig. 3 is a plan.

Like parts are designated by corresponding letters of reference in all the figures.

The object of my present invention is the production of a simple, cheap, durable, and convenient shipping-can for petroleum, varnish, and other liquids or semi-liquids, one that can be produced at a reasonable cost, and that will be suitable for transportation over long distances. To accomplish this object I construct a can, C, of sheet metal and provide the same with a bottom, B, and a head or top, C', both of which are "double-seamed" or otherwise secured and soldered to the can-body in any well-known and approved manner. The body of this can I make tapering from the bottom to the top and place the same in a wooden jacket consisting of the shell A, top D, and bottom L. The jacket may be made of scale-board to combine cheapness, lightness, and durability. The jacket is strengthened by a hoop, D', on the top and an outside hoop, B', on the bottom.

In the can C—*i. e.*, in the head C' thereof—I provide a nozzle, G, and stopper G', for emptying and filling the can; and to facilitate this operation I provide a vent, H, Fig. 1. consisting of an L-shaped spring-rod, I, secured to the under side of said head, with the vertical portion of said rod passing through an opening, $d$, Fig. 3, said vertical portion having a disk, J, acting as a valve to close against the said opening, and an eye, $i$, by means of which the vent is actuated. Other forms of vent may be used in this connection without departing from the spirit of my invention.

To handle this jacketed can conveniently, I provide the same with a bail, F, hinged to staples K, as clearly illustrated in Figs. 1 and 2.

In the making up of this can, I first produce the metallic portion thereof all complete. I then form the jacketed part A with the top D and upper hoop, D', and lower outside hoop, B', and then place the metallic part in the wooden portion, the parts being made tapering, so as to readily enter, and, when properly placed in position, to fit together. The parts being thus assembled, I proceed to lock the can into its jacket by placing the bottom L in position and then forcing an inside hoop, E, onto it, taking care to secure the hoops B' and E to the jacket A by means of nails $e$, driven through the hoops and jacket at proper intervals and clinched, if necessary. Instead of such nails, I may use rivets or any other suitable and convenient means of fastening.

In the top board, D, of the jacket portion of my improved shipping-can, I leave two circular apertures, $a$ $b$, respectively, the former being for the passage of the spout or nozzle G, while the latter provides for the passage of the eye $i$ of the vent H. This latter eye is not completely formed until the insertion of said vent device into the can, it being so large as to prevent its being pushed into the can through the vent-aperture $d$, Fig. 3.

R represents a ring of metal or other suitable substance fixed around the lower outer edge of the can. The ring, being on the edge, extends out beyond the periphery of the side of the can, and also extends below the bottom of the can. By means of this ring the bottom and sides of the can are prevented from coming in contact with the sides and bottom of the jacket, as shown in Fig. 2, thereby preventing the parts from sticking together or becoming rusty, incident to contact. By thus holding the can away from the inner sides of the jacket, the can is easily inserted or removed. This ring fits snugly against the sides of the can, and serves to hold said can in a fixed position in the jacket, an annular space being formed between the outer sides of the can and the inner sides of the jacket.

It will now be readily observed that this shipping-can has the largest part of its tapering body downward, thus giving the base of the can the largest area, whereby it is better adapted for shipping when filled than a parallel or cylindrical can, or one having the largest diameter at its top.

Owing to the insertion of the locking-hoop E, there is formed below the bottom L an annular recess, N, Fig. 2, which protects the said bottom from wear, and produces, as it were, a rim, on which the hand may find a convenient hold when the can is being emptied.

It will now be further observed that in the manner as specified I have succeeded in producing a tapering jacketed can for shipping purposes, having its widest part or largest diameter at its bottom, and possessing all the necessary and desirable prerequisites of such a package—viz., strength combined with lightness, durability, and cheapness—so that this can forms a very marketable and desirable article for manufacturers of that class of merchandise to which my invention appertains.

Having thus fully described my invention, I claim as new and desire to secure to me by Letters Patent of the United States—

1. In a shipping-can, a jacket provided with an opening, $a$, in combination with a can having a nozzle, G, and with ring R, whereby a space is formed between the bottoms of the can and jacket, and an annular space formed between the outer sides of the can and the inner sides of the casing, substantially as described, and for the purposes set forth.

2. The combination, with the can C, of the vent H, consisting of an L-shaped spring-bar, I, secured to the head of said can at $c$, said bar I being provided with a valve-disk, J, adapted to close against the inner side of said head and terminating in an eye, $i$, substantially in the manner as and for the object stated.

In testimony that I claim the foregoing as my invention I have hereto set my hand in the presence of two subscribing witnesses.

GEO. J. RECORD.

Attest:
MICHAEL J. STARK,
MARY J. RECORD.